United States Patent
Guo et al.

(10) Patent No.: US 8,861,328 B2
(45) Date of Patent: Oct. 14, 2014

(54) METHOD FOR ANTENNA CALIBRATION IN A WIDEBAND COMMUNICATION SYSTEM

(75) Inventors: Yuxin Guo, Sollentuna (SE); Jingyi Liao, Beijing (CN)

(73) Assignee: Optis Cellular Technology, LLC, Plano, TX (US)

( * ) Notice: Subject to any disclaimer, the term of this patent is extended or adjusted under 35 U.S.C. 154(b) by 108 days.

(21) Appl. No.: 13/378,263

(22) PCT Filed: Jun. 17, 2009

(86) PCT No.: PCT/SE2009/000308
§ 371 (c)(1),
(2), (4) Date: Dec. 14, 2011

(87) PCT Pub. No.: WO2010/147515
PCT Pub. Date: Dec. 23, 2010

(65) Prior Publication Data
US 2012/0087230 A1      Apr. 12, 2012

(51) Int. Cl.
*H04W 72/04*      (2009.01)
*H04B 17/00*      (2006.01)
*H04B 7/04*       (2006.01)
*H01Q 3/26*       (2006.01)
*H04J 11/00*      (2006.01)

(52) U.S. Cl.
CPC ........ *H04B 17/0062* (2013.01); *H04B 17/0005* (2013.01); *H04B 7/0413* (2013.01); *H04B 17/0085* (2013.01); *H01Q 3/267* (2013.01)
USPC .......................................... 370/208; 370/330

(58) Field of Classification Search
CPC ......... G01S 5/14; G01S 13/46; G01S 13/931; G01S 1/022; G01S 2013/466; G01S 2205/002; G01S 5/021; G01S 5/0215; G01S 5/0221; G01S 5/0294; G01S 7/4026; H04W 64/00; G01V 3/104; H01Q 3/08; H01Q 9/285
USPC ........................... 370/254–350; 709/201–213
See application file for complete search history.

(56) References Cited

U.S. PATENT DOCUMENTS 6,157,343 A      12/2000  Andersson et al.
(Continued)

FOREIGN PATENT DOCUMENTS

WO            9954960        10/1999
WO        2007109085 A2       9/2007
WO        2008065523 A2       6/2008

OTHER PUBLICATIONS

CATT on antenna calibration of LTE, 3GPP TSG RAN WG1 meeting # 52 bis Shenzhen, China, Mar. 31-Apr. 4, 2008.*
3rd Generation Partnership Project. "Abesnce of Array Calibration—Impact on Precoding Performance." 3GPP TSG-RAN WG1 #49, R1-072463, Kobe, Japan, May 7-11, 2007.

(Continued)

*Primary Examiner* — Ayaz Sheikh
*Assistant Examiner* — Debebe Asefa
(74) *Attorney, Agent, or Firm* — Vincent J. Allen; Carstens & Cahoon, LLP

(57) ABSTRACT

The present invention relates to a method for antenna calibration in a communication system having a Bandwidth divided into multiple frequency intervals M with multiple communication units 40; 50, each comprising communication circuitry 21, 24: 31, 34; 41, 42; 51, 52, 54 connected to an antenna arrangement 22, 25; 32, 35; 44, 45; 55, 49, communicating with each other over multiple communication channels. The method comprises: establishing a calibration sequence to perform antenna calibration for at least one of said multiple frequency intervals; converting the calibration sequence from the frequency domain to the time domain; transmitting a part of said calibration sequence in the time domain from a first communication circuitry 21; 34; 41; 51, 54 to a second communication circuitry 24; 31; 42; 52, 54 over the multiple communication channels; receiving the part of said calibration sequence in the second communication circuitry 24; 31; 42; 52, 54 for each communication channel; performing antenna calibration based on the received part of the calibration sequence.

2 Claims, 5 Drawing Sheets

(56) References Cited

U.S. PATENT DOCUMENTS

| | | |
|---|---|---|
| 6,747,595 B2 | 6/2004 | Hirabe |
| 6,963,742 B2* | 11/2005 | Boros et al. .................. 455/424 |
| 7,986,755 B2 | 7/2011 | Tung et al. |
| 8,049,662 B2 | 11/2011 | Stayton |
| 2005/0022003 A1 | 1/2005 | Oliphant |
| 2006/0111050 A1* | 5/2006 | Choi et al. ................. 455/67.11 |
| 2006/0192710 A1 | 8/2006 | Schieblich |
| 2008/0144736 A1* | 6/2008 | Assouline .................... 375/298 |

OTHER PUBLICATIONS

3rd Generation Partnership Project. "On Antenna Calibration of LTE" 3GPP TSG RAN WG1 meeting #52bis, R1-081330, Shenzhen, China, Mar. 31- Apr. 4, 2008.

3rd Generation Partnership Project. "Response to LS on Switch Time Requirements for LET TDD." 3GPP TSG RAN WG1 Meeting #52bis, R1-081181 (R4-080535), Shenzhen, China, Mar. 31-Apr. 4, 2008.

Adaptive Array Antenna for W-CDMA Systems, Yutaka Yasui, et al Fujitsu Sci. Tech. J., 38, 9 pp. 192-200 (Dec. 2002).

* cited by examiner

METHOD FOR ANTENNA CALIBRATION IN A WIDEBAND COMMUNICATION SYSTEM

TECHNICAL FIELD

The present invention relates to a method for antenna calibration in a wideband communication system, wherein two communication units communicate over multiple communication channels. The invention also relates to a system, and a communication unit.

BACKGROUND

Wideband communication systems, such as the LTE-TDD system, have a significantly wider bandwidth than in previous wireless standards, e.g. U-TRAN supports a bandwidth of 5 MHz. The LTE-TDD system supports the application of multiple antenna techniques, e.g. MIMO and beam forming as disclosed in reference [1]. A base station system using an adaptive beam forming algorithm is expected to increase its maximum range and capacity due to an improved antenna gain and the reduction of interference from other spatially separated users. E.g. an antenna array having M antenna elements may, in principle, provide a mean power gain of M over white noise. Beam forming algorithm normally assumes that the antenna array has no errors and that its multi-channel transceiver has an identical transfer function for all transceiver chains.

However, due to mechanical and electrical variations in the RF components, such as amplifiers, mixers and cables, that occur over time due to temperature variations, aging, and other factors, the spatial signature of the baseband receive/transmit signal is significantly different from the actual RF receive/transmit signal. As a result, the transfer functions of the RF transceivers usually differ from each other, i.e. amplitude, time and phase deviations appear between different antenna branches.

Thus, it is very important to perform antenna calibration to compensate the amplitude, time and phase deviation between the different antenna branches to achieve the expected antenna gain. Furthermore, it is especially important to perform antenna calibration across eNodeB TX/RX chain in a LTE-TDD system for exploiting reciprocity.

Antenna calibration techniques for the complete bandwidth have been suggested in the prior art, as disclosed in references [6]-[8].

As mentioned above, the bandwidth in LTE is significantly wider than in previous wireless standards, such as WCDMA, and this makes it difficult to ensure that the overall channel response in the RF chains of NodeB are close to ideal and thus do not introduce significant variations over frequency of the communication channel over the bandwidth. If not properly dealt with, the system may have to cope with a substantial increase of frequency selectivity, which may have serious implications on channel estimation quality as well as the performance of precoding, as disclosed in reference [2].

When the bandwidth is divided into multiple frequency intervals, such as in an OFDM system, antenna calibration in each frequency interval (or sub-band) may be performed independent of each other. Several antenna calibration techniques related to OFDM have been suggested, as disclosed in references [9]-[11]. However, these techniques require that a time period is dedicated for transmitting antenna calibration data which in turn will reduce the overall performance of the communication system since valuable time-slots in the transmission need to be used for antenna calibration purposes instead of transmitting user information.

This is especially true in the LTE-TDD system, having an applicable frame structure type 2 as shown in FIG. 1 and disclosed in reference [1]. A radio frame 10 has a radio frame duration $T_f$=10 ms corresponding to 307200.$T_s$ (basic time units). The radio frame 10 consists of two half-frames 11, each with 5 ms duration (153600.$T_s$). Each half-frame consists of five subframes 12, each with 1 ms duration (30720.$T_s$) and defined as two slots 13 of 0.5 ms duration each. Subframe number 1, and in some uplink-downlink configurations also subframe number 6, is a special frame "S" with three fields DwPTS 14, GP 15 (guard period) and UpPTS 16. The duration of DwPTS 14 and UpPTS 16 may vary, but the minimum duration of GP 15 is 2192.$T_s$, which is equal to approximately 71 μs (about one OFDM symbol duration which is equal to 2048 $T_s$ when Δf=15 kHz). For a LTE-TDD system, antenna calibration is preferably performed in the GP 15 since this has less impact on the normal downlink (DL) and uplink (UL) transmission. However, the end of the GP 15 is used for DL and UL switch in the LTE-TDD system to support the UL transmission of the far-near UEs, and also supports the switch between LTE-TDD system and LCR-TDD system, as disclosed in reference [5].

The LTE-TDD system requires time to switch between DL and UL for UE; and if considering the support of the UL transmission of the far-near UEs and compatibility with the LCR-TDD system, the time left for antenna calibration is not enough if the calibration is to be performed in the GP 15.

Thus, there is a need of a more effective antenna calibration in a communication system with communication units having multiple transmission chains and/or multiple reception chains that communicate on several frequency sub-bands, especially for a wideband system.

US 2006/0111050 A1 relates to a multi-antenna communication system employing improved signal calibration.

CATT: 3GPP DRAFT of TSG RAN WG1 meeting #52bis, "On antenna calibration of LTE", R1-081330 relates to antenna calibration for performance guarantees for MIMO in LTE.

US 2005/0220003 A1 relates to a transceiver with calibrated I and Q paths and methods for deconvolved calibration.

SUMMARY OF THE INVENTION

An object with the present invention is to provide a method for antenna calibration in a wideband communication system communicating over multiple communication channels using multiple frequency intervals that requires less transmission time compared to prior art methods.

This object is achieved by a method for antenna calibration in a wideband communication system comprising multiple communication units, each comprising communication circuitry connected to an antenna arrangement, communicating with each other over multiple communication channels. The communication system has a bandwidth divided into multiple frequency intervals (M), and the method comprises:

a) establishing a calibration sequence to perform antenna calibration for at least one of said multiple frequency intervals, b) converting the calibration sequence from the frequency domain to the time domain, c) transmitting a part of said calibration sequence in the time domain from a first communication circuitry to a second communication circuitry over the multiple communication channels, d) receiving the part of said calibration sequence in the second communication circuitry for each communication channel, e) performing antenna calibration based on the received part of the calibration sequence.

Another object is to provide a communication unit communicating over multiple communication channels in a wideband communication system using multiple frequency intervals, and communicating calibration sequences that requires less transmission time compared to prior art communication units.

This object is achieved by a communication unit (adapted to communicate in a wideband communication system having a bandwidth divided into multiple frequency intervals) comprising:
 a transmission part having multiple Tx chains each connected to an antenna,
 a processing unit configured to: perform antenna calibration of the Tx chains based on a calibration sequence transmitted via each Tx chain; establish the calibration sequence to perform antenna calibration for at least one of said multiple frequency intervals; convert the calibration sequence from the frequency domain to the time domain; and transmit a part of the calibration sequence in the time domain from the transmission part which is intended to be received in a receiver part over the multiple communication channels, and
 means to receive at least the part of the calibration sequence to perform the antenna calibration.

This object is also achieved by a communication unit (adapted to communicate in a wideband communication system having a bandwidth divided into multiple frequency intervals) comprising:
 a receiver part having multiple Rx chains each connected to an antenna, and
 a processing unit configured to: perform antenna calibration of said Rx chains based on at least a part of a calibration sequence received via each Rx chain; receive the part of said calibration sequence in the receiver part for each communication channel; perform antenna calibration based on at least the received part of the calibration sequence.

An advantage with the present invention is that the duration of the calibration information transmission may be reduced compared to prior art. This applies especially to a LTE-TDD system in which the Guard Period duration limits the available time period for transmitting calibration data, and the present invention provides a solution wherein the required transmit window (containing a part of the calibration sequence) is less than the Guard Period duration.

Another advantage is that the present invention supports subband calibration for a wideband system.

Still another advantage is that the present invention supports the transmission of test signals for antenna calibration in the guard period for a 3GPP TDD system, which does not loose any transmission efficiency.

An advantage in a preferred embodiment of the present invention is that different granularity of the subband calibration is allowed, i.e. by setting Tune_i ($1 \leq i \leq M$) for different subbands.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

The invention relates to a method that requires a transmission part and its associated receiver part. The transmission part comprises a plurality of transmission chains and/or the receiver part comprises a plurality of reception chains. Each transmission/reception chain comprises RF components, such as amplifiers, mixers and cables, varying over time and affects the individual transfer function as described in the background.

The invention is intended to be used in a wideband communication system having a bandwidth divided into multiple frequency intervals, such as multi-carrier transmission having several more narrowband frequency-multiplexed signals. Preferably, OFDM is used which is a special case of multi-carrier transmission.

FIGS. 2-5 describe communication systems and communication units that may be used to implement the present invention in order to improve the efficiency of required antenna calibration.

Figure 1:
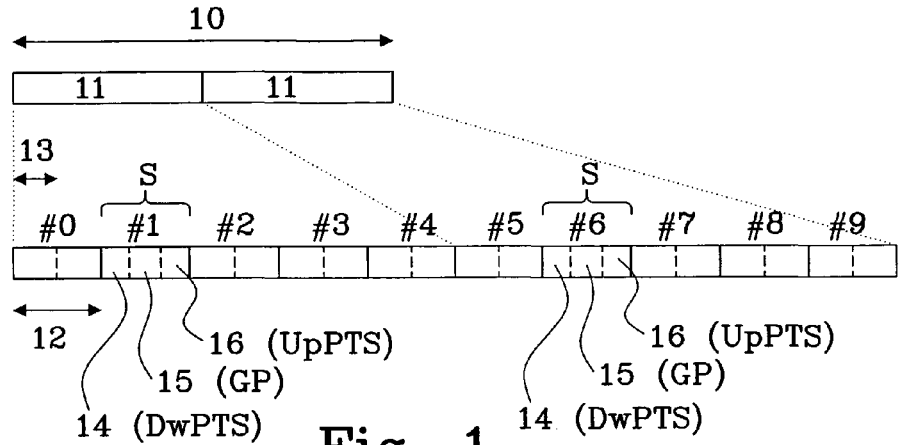
FIG. 1 shows the frame structure type 2 in a LTE-TDD system.
Figure 2:
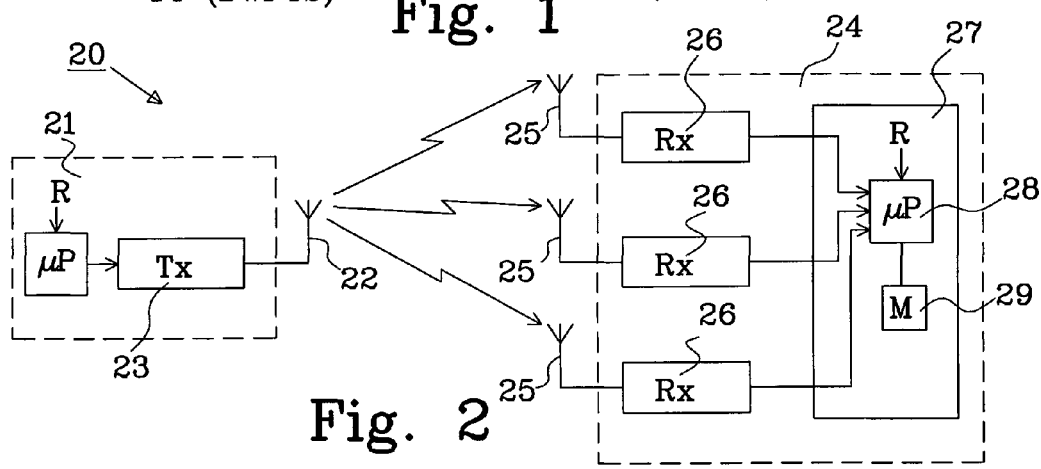
FIG. 2 shows a first embodiment of a communication system in which the present invention could be implemented.

FIG. 2 shows a first embodiment of a communication system 20 comprising a transmission part 21 and a receiver part 24. The transmission part 21 comprises in this example of a single antenna 22 coupled to a transmission (Tx) chain 23 coupled to a micro processor μP. A reference sequence indicated by "R" is accessible to the μP which feeds the reference sequence to the Tx chain for transmission via the antenna 22. The receiver part 24 comprises in this example of three antennas 25; each coupled to an individual reception (Rx) chain 26; and a processing unit 27. The processing unit comprises a processor (μP) 28 having access to the reference sequence "R" transmitted from the transmission part 21, and a memory (M) 29.

The actual process of calibrating the antennas in the receiver part 24 is known to a skilled person and could be summarized as follows. The reference sequence "R" is fed to the Tx chain 23 and transmitted from antenna 22 and thereafter received by the three antennas 25, processed by each individual Rx chain 26 and the received signal is fed to the processor 28 in the processing unit 27. The μP 28 compares each received signal with the reference sequence "R" and identifies the differences, e.g. amplitude, time and phase deviations, between the received signals and the reference sequence R. Calibration of each Rx chain 26 and corresponding antenna 25 may thereafter be performed and necessary calibration data are stored in M 29 for further use when receiving multiple signals via the Rx chains, as is obvious for the skilled person.

The transmission part 21 could be implemented as a Tx chain coupled to an antenna in any communication unit within the system, or the transmission part 21 and the receiver part 24 may be integrated in the same communication unit, as described in connection with FIG. 4. Furthermore, the Tx chain 23 and the antenna 22 may be used only for calibration purposes, i.e. implemented as a reference transmission part in any communication unit as described in connection with FIG. 5, or as a separate reference unit.

Figure 3:
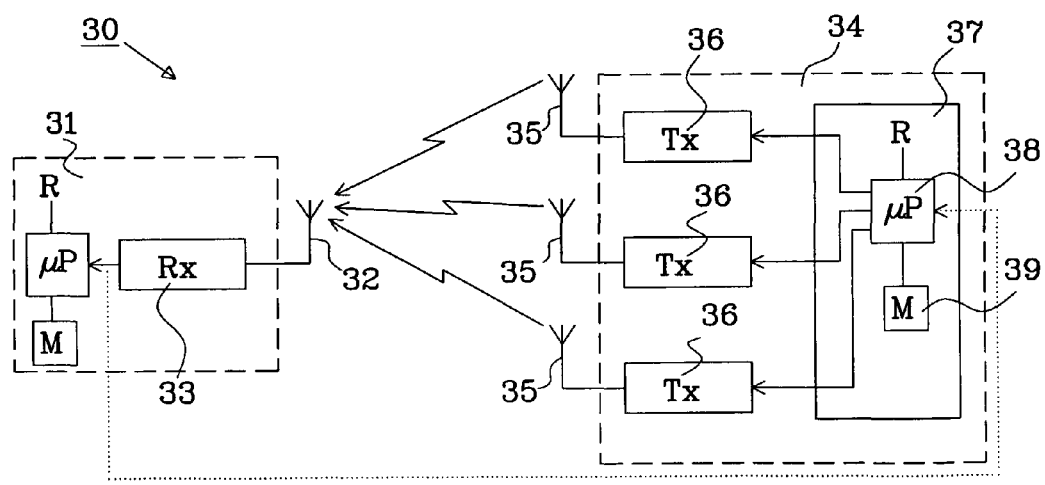
FIG. 3 shows a second embodiment of a communication system in which the present invention could be implemented.

FIG. 3 shows a second embodiment of a communication system 30 comprising a receiver part 31 and a transmission part 34. The receiver part 31 comprises in this example of a single antenna 22 coupled to a reception (Rx) chain 33. Optionally, the receiver part 31 may include a micro processor μP and a memory M. The transmission part 34 comprises in this example of three antennas 35, each coupled to an individual transmission (Tx) chain 36; and a processing unit 37. The processing unit 37 comprises a processor μP 38, a memory (M) 39.

The actual process of calibrating the antennas in the transmission part 34 is similar to the process described above. The reference sequence R, which is accessible to the μP 38 is fed to each Tx chain 36 to be transmitted from each corresponding antenna 35 in the transmission part 34. Three signals are received by the single antenna 32 in the receiver part 31 and are processed by the Rx chain 33 and the received signal is then forwarded to the μP 38 for further processing as indicated by the dotted line. The μP 38 compares each received signal with the reference sequence "R" and identifies the differences, e.g. amplitude, time and phase deviations, between the received signals and the reference sequence R. Calibration of each Tx chain 36 and corresponding antenna 35 may thereafter be performed and necessary calibration data are stored in M 39 for further use when transmitting multiple signals via the Tx chains, as is obvious for the skilled person.

If all three Tx chains 36 should be calibrated at the same time, it is necessary to assign different reference sequences which are orthogonal to the Tx chains, i.e. one reference sequence for each Tx chain 36, in order for the receiver part 31 to be able to separate the reference sequences and perform antenna calibration. Alternatively, the same reference sequence is used for all Tx chains in a sequential manner, which may cause a problem since the required transmission time will be increased by a factor three, since there are three Tx chains.

As mentioned above, it is of course possible to arrange a micro processor μP in the receiver part 31 and compare the received signals with the reference sequence R provided knowledge of the reference sequence R is available. The result from the comparison may be stored in a memory M in the receiver part 31 and is thereafter transferred to the transmission part 34 for calibration purposes.

The receiver part 31 could be implemented as an antenna coupled to an Rx chain in any communication unit within the system, or the receiver part 31 and the transmission part 34 may be integrated in the same communication unit, as described in connection with FIG. 4. Furthermore, the Rx chain 33 and the antenna 32 may be used only for calibration purposes, i.e. implemented as a reference receiver part in any communication unit as described in connection with FIG. 5, or as a separate unit.

The transmission part 21, 34 may be regarded as a first communication circuitry and the receiver part 24, 31 may be regarded as a second communication circuitry in the one way communication system 20 shown in FIG. 2. However, the first communication circuitry may naturally include a receiver part, as disclosed in connection with FIGS. 4 and 5, and the second communication circuitry may naturally include a transmission part, as disclosed in connection with FIGS. 4 and 5. The actual number of Tx chains and Rx chains in the respective communication circuitry are not important as long as the communication between the communication circuitry is performed on multiple communication channels, as illustrated in FIGS. 2 and 3.

Figure 4:
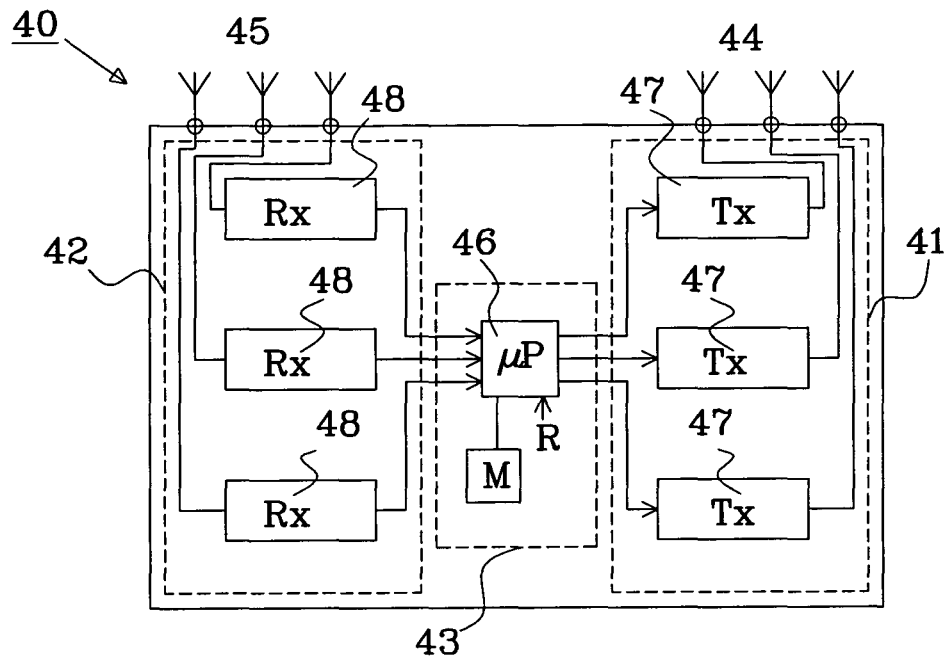
FIG. 4 shows a first embodiment of a communication unit in which the present invention could be implemented.

FIG. 4 shows a first embodiment of a communication unit 40 with a transmission part 41, a receiver part 42 and a processing unit 43. The transmission part 41 comprises Tx chains 47 coupled between each transmit antenna 44 and the μP 46 in the processing unit 43, and the receiver part 42 comprises Rx chains 48 coupled between each receive antenna 45 and the μP 46 in the processing unit 43.

Any transmit antenna 44 may be used when performing antenna calibration of the receiver part 42 as described in connection with FIG. 2, and any receiver antenna 45 may be used when performing antenna calibration of the transmission part 41 as described in connection with FIG. 3. Calibration data is stored in a memory (M) accessible to the processor 46 to be used when transmitting or receiving signals to compensate for any differences introduced by variations in RF characteristics of the components of the Tx/RX chains and the respective antenna.

The transmission part 41 may be regarded as a first communication circuitry and the receiver part 42 may be regarded as a second communication circuitry, although they belong to the same communication unit 40. It is naturally possible to integrate the first and the second communication circuitry in a common transceiver circuitry connected to separate transmit antennas 44 and receive antennas 45.

Figure 5:
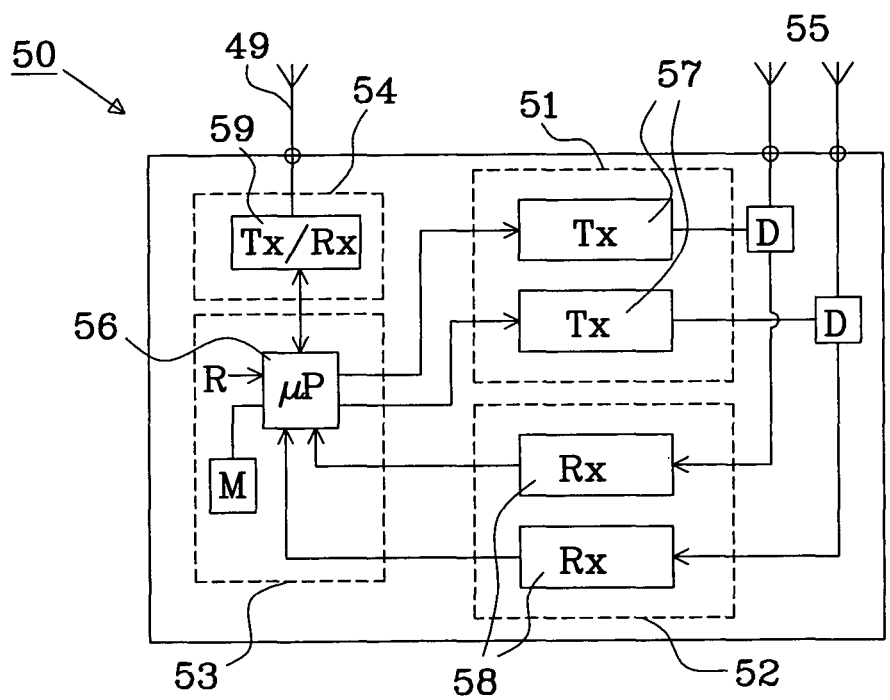
FIG. 5 shows a second embodiment of a communication unit in which the present invention could be implemented.

FIG. 5 shows a second embodiment of a communication unit 50 with a transmission part 51, a receiver part 52 and a processing unit 53 and a reference part 54. In this embodiment, the transmission part 51 and the receiver part 52 have common antennas 55, and the transmission part 51 comprises Tx chains 57 coupled between each common antenna 55 and the μP 56 in the processing unit 53, and the receiver part 52 comprises Rx chains 58 coupled between each common antenna 55 and the μP 56 in the processing unit 53. The respective Tx chain and Rx chain are separated by a duplex filter D The reference part 54 is provided with a single reference antenna 49 which is used to transmit a reference sequence intended to be received by the common antennas 55 coupled to the receiver part 52 via the duplex filters D when performing antenna calibration of the receiver part 52 as described in connection with FIG. 2, or the reference antenna 49 is used to receive signals transmitted from common antennas 55 coupled to the transmission part 51 via the duplex filters D when performing antenna calibration of the transmission part as described in connection with FIG. 3. Thus, the reference part 54 will act as a transmission part when performing antenna calibration for the receiver part 52, or the reference part 54 will act as a receiver part when performing antenna calibration for the transmission part 51.

The reference part 54 is also provided with a transceiver 59 to be able to transmit and receive signals, and is coupled to a processor (µP) 56 in the processing unit 53 which controls the function of the reference part 54 and feeds the reference sequence R for transmission. Calibration data is stored in a memory (M) accessible to the processor 56 to be used when transmitting or receiving signals to compensate for any differences introduced by variations in RF characteristics of the components of the Tx/RX chains and the duplex filters D.

The transmission part 51 may be regarded as a first communication circuitry and the reference part 54 may be regarded as a second communication circuitry, when performing antenna calibration of the transmission part. On the other hand if antenna calibration is performed on the receiver part, the reference part 54 may be regarded as a first communication circuitry and the receiver part 52 may be regarded as the second communication circuitry.

In order to be able to receive signals for performing antenna calibration of the Rx chains in a communication unit, a signal needs to be transmitted from a means to transmit. In the disclosed embodiments this have been exemplified as: a single antenna coupled to a Tx chain (as described in connection with FIG. 2), one transmit antenna coupled to a Tx chain in any communication unit (including the same communication unit intended to receive the signal as described in connection with FIG. 4), an antenna coupled to a reference part (as described in connection with FIG. 5).

Furthermore, in order to be able to perform antenna calibration of the Tx chains in a communication unit, signals containing the calibration sequence for each communication channel (i.e. that have passed through each Tx chain) needs to be received. In the disclosed embodiments this have been exemplified as: a single antenna coupled to a Rx chain and the received signals are transferred back to the communication unit transmitting the reference signal (as described in connection with FIG. 3), one receive antenna coupled to a Rx chain in any communication unit (including the same communication unit transmitting the reference signal as described in connection with FIG. 4), an antenna coupled to a reference part (as described in connection with FIG. 5).

As explained above, in some communication systems, there is a desire to reduce the transmission duration of the calibration data needed to perform antenna calibration without affecting the available time slots to transfer communication data, e.g. using the guard period in the frame structure type 2 in a LTE-TDD system to transfer calibration data, in a wideband communication system in which the bandwidth is divided into a plurality of frequency intervals (subbands), such as multi-carrier transmission in an OFDM system which will be used to describe the invention.

In order to achieve this, it is necessary to assign reference sequences $R_i$ to each subband i and establish a calibration sequence based on the reference sequences to minimize the time duration needed to fit into a desired time interval. The present invention will provide this as described below.

As mentioned earlier, the invention requires a transmission part and its associated receiver part. The transmission part generates a calibration sequence in the frequency domain with an associated tunable value Tune_i for each subband i ($1 \leq i \leq M$) indicating the "0" (ZERO) interval of the subcarriers between adjacent non-ZERO subcarriers.

Figure 6:
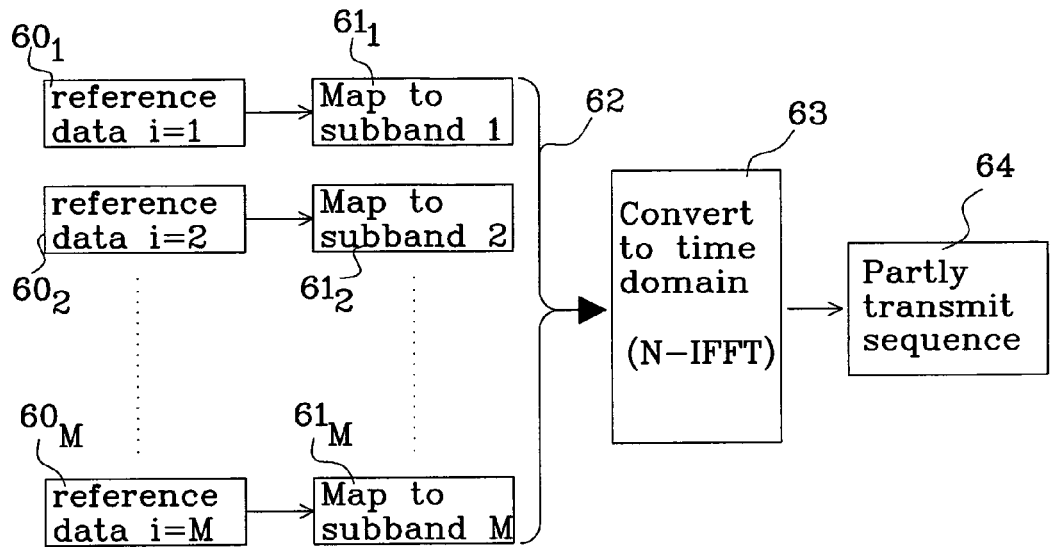
FIG. 6 shows a flow chart illustrating the transmission process according to the invention.

With reference to FIG. 6, reference data for each subband is provided in 60$_i$, i=1 to M, and is mapped to each subband as indicated in 61$_i$, i=1 to M as exemplified below.

Subband 1

Reference data suitable for antenna calibration of subband 1 may be expressed as $$\{a_1, a_2, a_k\}$$

which are mapped to subband 1 with a predetermined value, e.g. Tune__1=4, i.e. the reference sequence $R_1$ for the subcarriers in subband 1 will be:

$$R_1 = \{a_1, 0, 0, 0, a_2, 0, 0, 0, \ldots a_k, 0, 0, 0\}$$

since Tune__1 =4 corresponds to only every four subcarrier have non_ZERO value but its even subcarriers are ZERO.

Subband 2

Reference data suitable for antenna calibration of subband 2 may be expressed as $$\{b_1, b_2, \ldots, b_m\}$$

which are mapped to subband 1 with a predetermined value, e.g. Tune__1=2, i.e. the reference sequence $R_2$ for the subcarriers in subband 2 will be:

$$R_2 = \{b_1, 0, b_2, 0, b_3, 0, b_4, 0, \ldots, b_{m-1}, 0, b_m, 0\},$$

since Tune_1=2 corresponds to only every odd subcarrier have non_ZERO value and its even subcarriers are ZERO.

Subband M

Reference data suitable for antenna calibration of subband M may be expressed as $$\{c_1, c_2, \ldots, c_p\}$$

which are mapped to subband 1 with a predetermined value, e.g. Tune__1=P, i.e. the reference sequence $R_M$ for the subcarriers in subband M is:

$$R_M = \{c_1, 0, 0, \ldots 0, c_2, 0, 0, \ldots, 0, \ldots, c_{p-1}, 0, 0, \ldots, 0, c_p, 0, 0, \ldots, 0\},$$

since Tune__1=P corresponds to only every P subcarrier have non_ZERO value but its even subcarriers are ZERO.

Preferably Tune_i, for the subbands are even values.

Thus each reference sequence $R_i$ has a repetitive pattern and a calibration sequence is created based on the established reference sequences for all subbands, i.e. by superposing them, as indicated by the bracket 62.

The calibration sequence is created in the frequency domain, and is thereafter converted to time domain using a suitable transformation algorithm, such as Inverse Fast Fourier Transform (IFFT) or Inverse Discrete Hartley Transform (IDHT). In FIG. 6, an N point IFFT (N-IFFT) is illustrated in 63, wherein N is the number of samples during one OFDM symbol duration.

After N points IFFT processing, a calibration sequence in the time domain is generated and due to the mapping scheme illustrated above, the calibration sequence in the time domain has a pattern which repeats itself a number of times corresponding to min{Tune_i|$1 \leq i \leq M$} under good signal quality conditions. In the illustrative example above, the calibration sequence in the time domain will repeat itself two times, since min{Tune_i, $1 \leq i \leq M$}=2

The IFFT processing is followed by a partial transmission process, 64. Due to the repeat characteristics of the calibration sequence in the time domain only a part of the sequence produced by the conversion 63, only a first part of the calibration sequence is transmitted, determined by:

$$n = \frac{N}{\min\{\text{Tune\_i}, 1 \leq i \leq M\}} \quad (1)$$

wherein N is one OFDM symbol duration, and is the minimum value of Tune_i for all subbands M.

For example, when N=2048 (which is a constant for $\Delta f$=15 kHz in LTE-TDD system, se reference[1]) and min{Tune_i, $1 \leq i \leq M$}=2, then the first 1024 samples of the calibration sequence in the time domain is transmitted to the receiver part corresponding to approximately 34 µs. On the other hand if min{Tune_i, 123 i≤M}=8, then the first 256 samples (corresponding to approximately 9 µs) needs to be transmitted to the receiver, as indicated by 64.

In an alternative embodiment, a cyclic prefix is added to counter power ramping and to benefit antenna calibration in the receiver part. The cyclic prefix is added to the calibration sequence and the length of the sequence transmitted is determined by:

$$n_{CP} = \text{CP\_length} + \frac{N}{\min\{\text{Tune\_i}, 1 \leq i \leq M\}}, \quad (2)$$

wherein CP_length is the length of the cyclic prefix. The repeated part of the calibration sequence does not need to be transmitted as explained above.

Figure 8:
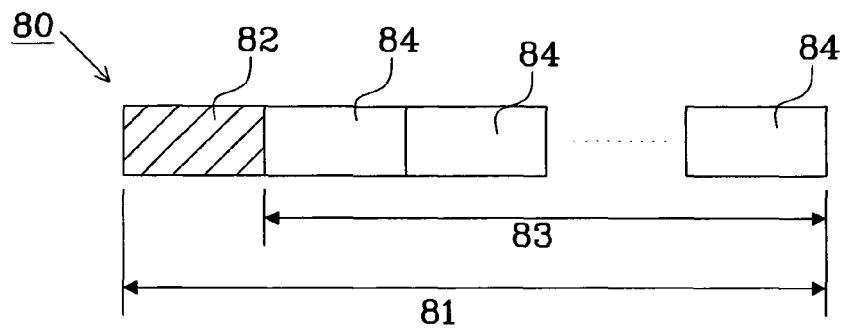
FIG. 8 shows a calibration sequence in the time domain to be transmitted by the transmission part of a communication unit.

FIG. 8 illustrates the complete calibration sequence 80 in the time domain having a length 81 of one OFDM symbol which is equal to 2048 samples. The calibration sequence 80 has a repetitive pattern, and the first part 82 is repeated one or more times (as indicated by 84) during the following time period 83. Only the first part 82, being within a transmit window, needs to be transmitted and the data contained in remaining part is redundant and therefore is not needed to be transmitted.

Figure 7:
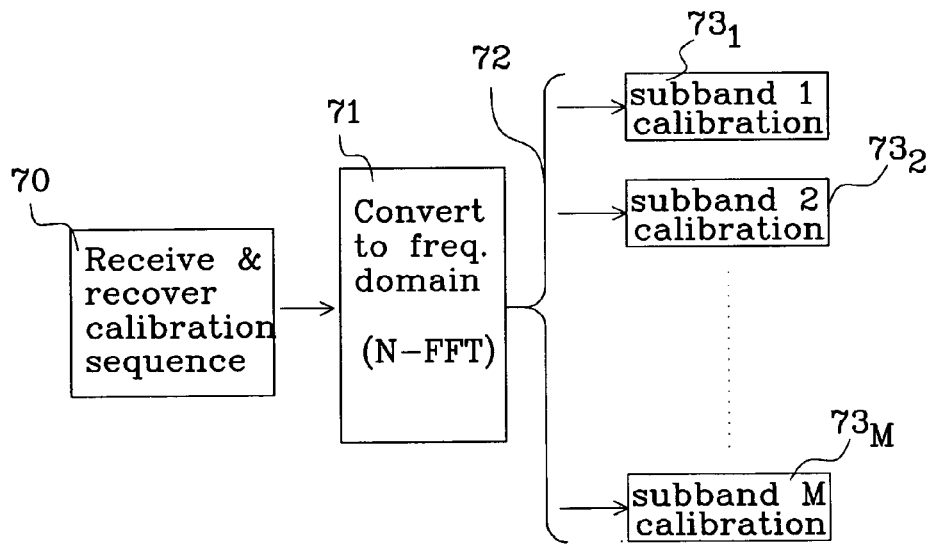
FIG. 7 shows a flow chart illustrating the receiving process according to the invention.
Figure 9:
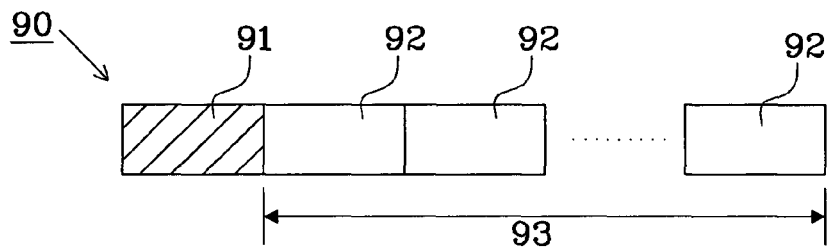
FIG. 9 shows a calibration sequence in the time domain received by the receiver part of a communication unit.

In FIG. 7, the transmitted part of the calibration sequence in time domain (with or without the cyclic prefix) is received in 70. If a cyclic prefix is used it is removed from the repetitive part of calibration sequence before the calibration sequence is recovered by concatenate the received repetitive part of the calibration sequence min{Tune_i,1≤i≤M} times, i.e. two times if min{Tune_i, 1≤i≤M}=2 and eight times if min{Tune_i, 1≤i≤M}=8 . This process is illustrated in FIG. 9, see below.

Then, a N points Fast Fourier Transform (FFT) processing 71 is performed on the recovered calibration sequence to convert it to the frequency domain and identify received calibration sequences $C_i$ for each subband which is illustrated by the bracket 72.

Antenna calibration for the subbands may thus be performed after the FFT processing 71 and identification 72, e.g. amplitude, time and phase shift calibration can be made by comparing the reference sequence $R_i$ and the received calibration sequence $C_i$ for each subband, as indicated by $73_i$, i=1 to M.

Alternatively, if the calibration process is performed in the time domain it is possible to omit the recovering process 70 of the calibration sequence and the N-FFT processing 71. The procedure to perform antenna calibration of the respective subband may then include the use of FIR-filters and equalizers to perform the antenna calibration in the time domain. However, it is more practical to perform the antenna calibration in the frequency domain.

It should be noted that the receiver must have knowledge of the tunable value for each subband in advance in order to be able to perform the antenna calibration. The tunable value for a subband may be chosen based on the frequency variation in adjacent non-ZERO subcarriers in, that subband.

FIG. 9 illustrates the complete calibration sequence 80 in the time domain after recovering has been performed. The received part of the calibration sequence 91 is repeated one or more times (as indicated by 92) during the following time period 93. Observe that only the first part 91, being within the transmit window of the transmission part, is transmitted and the data contained in remaining part is recovered by concatenate the received repetitive part of the calibration sequence min{Tune_i, 1≤i≤M} times.

Figure 10:
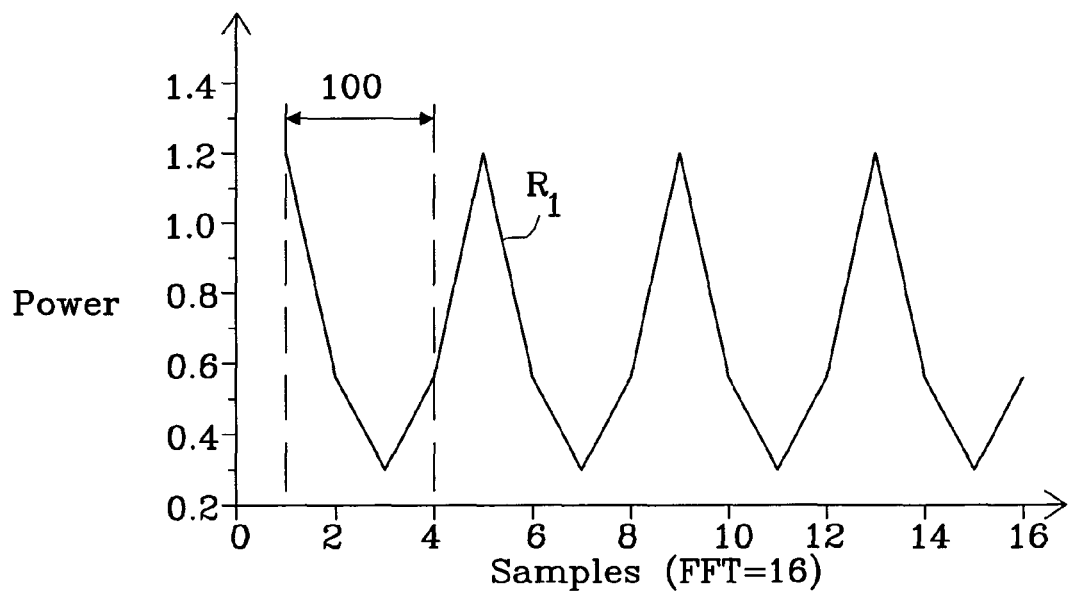
FIG. 10 shows a graph illustrating the calibration sequence for a first subband in the time domain.
Figure 11:
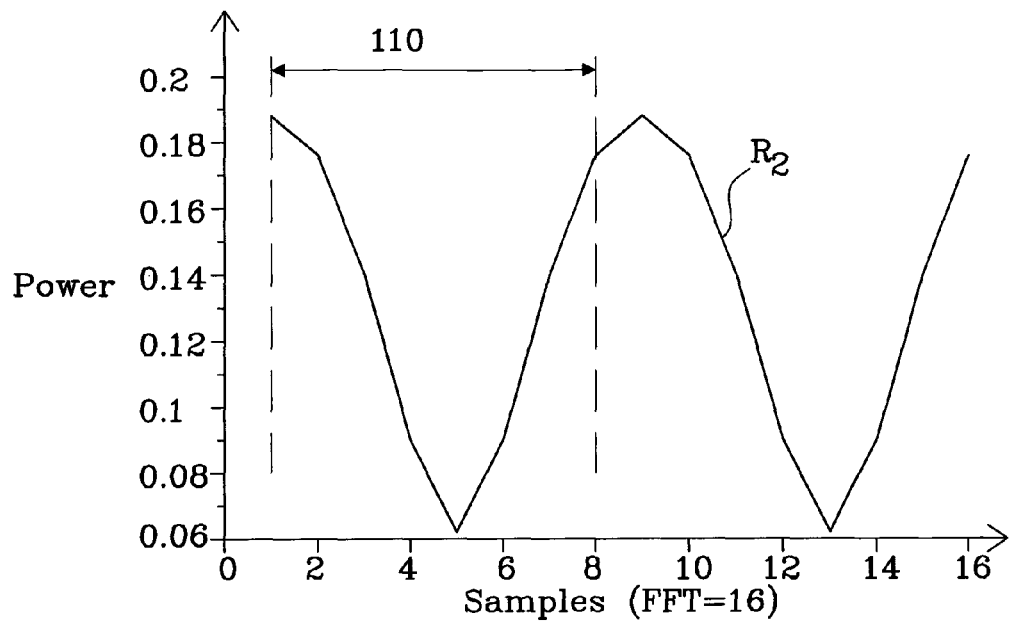
FIG. 11 shows a graph illustrating the calibration sequence for a second subband in the time domain.
Figure 12:
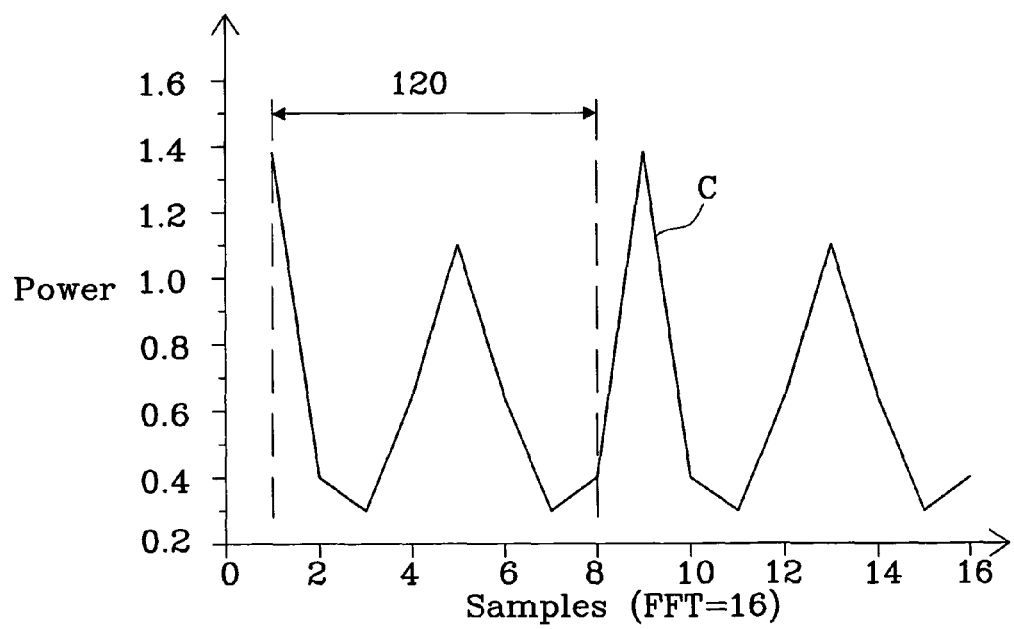
FIG. 12 shows a graph illustrating the superposed calibration sequence for the first and the second subband from FIGS. 10 and 11.

FIGS. 10-12 exemplifies the use of the present invention on a communication system having a FFT-size of N=16 and there are only two subbands to be calibrated, subband-1 and subband-2. The tunable value for subband-1 (Tune__1) is selected to be 4 and the tunable value for subband-2 (Tune__2) is selected to be 2 . The IFFT conversion of the reference sequence $R_i$ in the respective subband is illustrated in FIGS. 10 and 11, respectively.

The reference sequence $R_1$ for subband-1 has a repetitive pattern after conversion from the frequency domain to the time domain, as illustrated in FIG. 10. Tune__1=4, which gives a pattern that is repeated four times during the 16 samples. Only the indicated first four samples, illustrated by 100, needs to be transmitted in order to recover the complete sixteen samples of the reference sequence $R_1$.

The reference sequence $R_2$ for subband-2 also has a repetitive pattern after conversion from the frequency domain to the time domain, as illustrated in FIG. 11. Tune__2=2, which gives a pattern that is repeated two times during the 16 samples. Only the indicated first eight samples, illustrated by 110, needs to be transmitted in order to recover the complete sixteen samples of the reference sequence $R_2$.

FIGS. 10 and 11 are only shown to illustrate how each reference sequence $R_i$ will appear in the time domain if they were converted separately. However, the normal procedure is to create a single calibration sequence C containing calibration information for all subbands. The calibration sequence C is preferably created by superposing the reference sequences $R_i$ (in this case $R_1$ and $R_2$) in the frequency domain and thereafter perform the IFFT conversion.

FIG. 12 shows the calibration sequence C in the time domain with superposed reference sequences $R_1$ and $R_2$. The calibration sequence has two times repetition, and only the first eight samples, illustrated by 120, needs to be transmitted in order to recover the complete sixteen samples of the calibration sequence C, since it is possible to recover the complete calibration sequence by repeating the received part 120 two times in the receiver.

The micro processor µP in the transmission parts of the communication systems 20 and 30 and communication units 40 and 50 described in connection with FIGS. 2-5 needs to be modified to create a calibration sequence for all frequency intervals (subbands), convert the calibration sequence to time domain and thereafter control that only a part of the calibration sequence is transmitted to a receiver unit.

Furthermore, the micro processor µP in the receiver parts of the communication systems 20 and 30 and communication units 40 and 50 described in connection with FIGS. 2-5 needs to be modified to recover the complete calibration sequence in the time domain before antenna calibration may be performed either in the time domain or in the frequency domain after conversion.

Although the description mainly describes a LTE-TDD system, the present invention may be used to other systems, such LTE-FDD, and there is no limitation to use it in normal subframes. Furthermore, the present invention may be implemented in any OFDM system and should not be limited to a LTE system.

| Abbreviations | |
| --- | --- |
| DHT | Discrete Hartley Transform |
| E-UTRA | Evolved UTRA |

-continued

| Abbreviations | |
|---|---|
| FDD | Frequency Division Duplex |
| FFT | Fast Fourier Transform |
| IDHT | Inverse Discrete Hartley Transform |
| IFFT | Inverse Fast Fourier Transform |
| LTE | Long Term Evolution |
| MIMO | Multiple In Multiple Out |
| OFDM | Orthogonal Frequency Division Multiplexing |
| RF | Radio Frequency |
| TDD | Time Division Duplex |
| UTRA | Universal Terrestrial Radio Access |

References

[1] 3GPP TS 36.211 V8.6.0, "Evolved Universal Terrestrial Radio Access (E-UTRA); Physical channels and modulation"
[2] R1-072463, "Absence of Array Calibration-Impact on Precoding Performance", Ericsson, May 7, 2007.
[3] Yutaka Yasui et al. "Adaptive array antenna for WCDMA systems", FUJITSU Sci. Tech. Journal, Vol. 38, pages 192-200, December 2002.
[4] R1-081181, "Response to LS on switch time requirements for LTE TDD", Ericsson, Feb. 11, 2008.
[5] WO 2008/065523, "Apparatus, method and computer program product providing LCR-TDD compatible frame structure", Xiangguang CHE.
[6] US 2009/0027258, "Systems and methods for antenna calibration", Gregory T. STAYTON.
[7] U.S. Pat. No. 6,747,595, "Array antenna calibration apparatus and array antenna calibration method", Masashi HIRABE.
[8] WO 95/54960, "Phased array antenna calibration system and method using array clusters, Thomas V. SIKINA et al.
[9] US 2009/0046003, "Method and apparatus for beamforming of Multi-In-Multi-Out (MIMO) Orthogonal Frequency Division Multiplexing (OFDM) transceivers, Chien-Cheng TUNG et al.
[10] WO 2007/103085, "Method and apparatus for calibration and channel state feedback to support transmit beamforming in a MIMO system, Chang-Soo KOO et al.
[11] EP 1 503 518, "Antennas array calibration arrangement and method", Dr. Christian SCHIEBLICH.

The invention claimed is:

1. A method for antenna calibration in a wideband communication system comprising multiple communication units, each comprising communication circuitry connected to an antenna arrangement, communicating with each other over multiple communication channels, said communication system having a bandwidth divided into multiple frequency intervals, the method comprising:
establishing, in the frequency domain, a frequency-domain calibration sequence to perform antenna calibration for at least one of said multiple frequency intervals;
converting the frequency-domain calibration sequence from the frequency domain to the time domain to generate a calibration sequence in the time domain;
transmitting a part of but less than all of said calibration sequence in the time domain from a first communication circuitry to a second communication circuitry over the multiple communication channels;
receiving the part of said calibration sequence in the second communication circuitry for each communication channel; and
performing antenna calibration based on the part of the received calibration sequence, wherein (i) said multiple communication channels are selected by transmitting said part of the calibration sequence from a single antenna connected to the first communication circuitry, and receiving said part of the calibration sequence at multiple antennas connected to the second communication circuitry, each of said multiple antennas coupled to an individual reception chain, and wherein each reception chain and corresponding antenna are calibrated; or (ii) said multiple communication channels are selected by transmitting said part of the calibration sequence from multiple antennas connected to the first communication circuitry, each of said multiple antennas coupled to an individual transmission chain, and receiving said part of the calibration sequence at a single antenna connected to the second communication circuitry, and wherein each transmission chain and corresponding antenna are calibrated;
wherein the frequency intervals are selected to be sub-bands in an OFDM transmission, each sub-band comprising a plurality of subcarriers, and wherein said establishing the calibration sequence comprises mapping reference data for each sub-band into a reference sequence in the frequency domain with a predetermined repetitive pattern and superposing the reference sequences for all frequency intervals in the frequency domain to create said calibration sequence; and
wherein a value Tune_i is associated with the predetermined repetitive pattern for each frequency interval i indicating an interval between non-zero subcarriers in the reference sequence, and the method further comprises:
determining the length n of the part to be transmitted by:

$$n = \frac{N}{\min\{Tune\_i, 1 \leq i \leq M\}}$$

wherein N is one OFDM symbol duration, and $\min\{Tune\_i, 1 < i < M\}$ is the minimum value of Tune_i for all sub-bands M.

2. The method of claim 1, wherein the determination of the length $N_{cp}$ of the part to be transmitted includes a length of a cyclic prefix CP_length as defined by:

$$n_{CP} = CP\_length + \frac{N}{\min\{Tune\_i, 1 \leq i \leq M\}};$$

and said CP_length is removed from the received part of the calibration sequence before said performing step e).

* * * * *